US012209666B2

(12) United States Patent
Craig et al.

(10) Patent No.: US 12,209,666 B2
(45) Date of Patent: Jan. 28, 2025

(54) SEALING ELEMENTS WITH INTEGRATED INTRINSIC ENERGIZERS

(71) Applicant: Parker-Hannifin Corporation, Cleveland, OH (US)

(72) Inventors: Glenn R. Craig, Lakewood, OH (US); Dale M. Ashby, Solon, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 82 days.

(21) Appl. No.: 17/637,114

(22) PCT Filed: Dec. 8, 2020

(86) PCT No.: PCT/US2020/063694
§ 371 (c)(1),
(2) Date: Feb. 22, 2022

(87) PCT Pub. No.: WO2021/118950
PCT Pub. Date: Jun. 17, 2021

(65) Prior Publication Data
US 2022/0282790 A1  Sep. 8, 2022

Related U.S. Application Data

(60) Provisional application No. 62/945,559, filed on Dec. 9, 2019.

(51) Int. Cl.
*F16J 15/3208* (2016.01)
*F16J 15/3284* (2016.01)

(52) U.S. Cl.
CPC ....... *F16J 15/3208* (2013.01); *F16J 15/3284* (2013.01)

(58) Field of Classification Search
CPC .. F16J 15/3204; F16J 15/3208; F16J 15/3216; F16J 15/3284
See application file for complete search history.

(56) References Cited

U.S. PATENT DOCUMENTS 2,665,151 A * 1/1954 Fisler ...................... F16J 15/20
277/530
4,685,685 A * 8/1987 Iverson ................ F16J 15/3232
277/562

(Continued)

FOREIGN PATENT DOCUMENTS

DE  10 2017 208285 A1  11/2018
FR       1060532 A    4/1954

(Continued)

OTHER PUBLICATIONS

International Search Report and Written Opinion of the International Searching Authority for corresponding International Patent Application No. PCT/US2020/063694, dated Feb. 26, 2021.

(Continued)

*Primary Examiner* — Gilbert Y Lee
(74) *Attorney, Agent, or Firm* — Renner, Otto, Boisselle & Sklar, LLP (57) ABSTRACT

A sealing element (10) includes a sealing lip (16), an outer shell (12) defining an outer perimeter of the sealing element (10), and an energizing porous matrix structure (18) that is formed integrally with the sealing lip (16) or the outer shell (12) and extends from the outer shell (12) to the sealing lip (16). The energizing porous matrix structure (18) is used to tune a sealing force of the sealing element (10).

18 Claims, 4 Drawing Sheets

(56) References Cited

U.S. PATENT DOCUMENTS

| | | | |
|---|---|---|---|
| 5,163,692 A | | 11/1992 | Schofield et al. |
| 5,315,912 A | * | 5/1994 | Huber .................... F41F 3/073 89/1.816 |
| 5,377,999 A | * | 1/1995 | Gorman ............... F16J 15/3272 277/922 |
| 5,964,468 A | | 10/1999 | Chester et al. |
| 6,878,320 B1 | | 4/2005 | Alderson et al. |
| 7,431,307 B2 | | 10/2008 | Anderson et al. |
| 2004/0150168 A1 | * | 8/2004 | Heathcott ............ F16J 15/3236 277/500 |
| 2018/0340435 A1 | | 11/2018 | Schlemmer et al. |
| 2019/0301614 A1 | | 10/2019 | Hylla |

FOREIGN PATENT DOCUMENTS

| | | |
|---|---|---|
| GB | 2302572 B | 6/1999 |
| GB | 2336187 A | 10/1999 |
| GB | 2521394 A | 6/2015 |
| WO | 2020/197560 A1 | 10/2020 |

OTHER PUBLICATIONS

Written Opinion of the International Preliminary Examining Authority for corresponding International Patent Application No. PCT/US2020/063694, dated Nov. 3, 2021.

* cited by examiner

SEALING ELEMENTS WITH INTEGRATED INTRINSIC ENERGIZERS

This application is a national phase of International Application No. PCT/US2020/063694 filed Dec. 8, 2020, which claims priority to U.S. Application No. 62/945,559 filed Dec. 9, 2019, the entire disclosures of which are hereby incorporated by reference.

FIELD OF INVENTION

The present invention relates to sealing elements, and more particularly, to sealing elements having additional energizing elements that enable a tight seal.

BACKGROUND

Various fluid power applications use different types of sealing elements, such as rod seals, piston seals, or wiper seals. Exemplary applications include aerospace, oil and gas industry, medical, chemical processing, instrumentation, transportation, automotive, and power generation. For example, sealing elements may be used in gearboxes, pumps, motors, bearings, and turbines. Sealing elements may be static or dynamic and are used to seal against at least two contacting surfaces. In static applications, both surfaces are non-moving relative to each other, whereas in dynamic applications, at least one surface moves relative to the other sealing surface. The sealing elements require a predetermined amount of squeeze or compression to maintain contact with the sealing surfaces and prevent fluid leakage.

Seals typically require energizing to provide a tighter seal against the surface that is intended to be sealed. Energized seals may be required in industries that have extreme operating conditions, such as temperature, pressure, velocity, media, environment, and the like. For example, a spring-energized sealing lip may be used for positive oil retention in rotary shaft applications by providing increased radial lip contact forces. Conventional energizing elements are secondary features of the seal that are external to the main seal body and may include using the working fluid itself, or adding an elastomeric band or spring to the seal.

However, using the working fluid to energize the seal is disadvantageous in that the seal may be prone to leakage at pressures that are lower than the intended pressure. Using an additional elastomeric band or spring is also disadvantageous due to the added weight of the seal and more complex manufacturing and installation. Using an elastomeric band may also generate different forces that are too high for the hardware against which the seal is intended to seal, resulting in fracture or cracking of the hardware. Still other disadvantages of providing an additional component, such as a spring, include added noise, vibrations, and harshness during operation of the seal.

SUMMARY OF INVENTION

The present invention provides a sealing element having an intrinsic energizing element that is formed integrally with a sealing lip or an outer shell. The intrinsic energizing element is formed as porous matrix that extends between the outer shell and the sealing lip of the seal. The porous matrix structure is formed using additive manufacturing and may be configured to have any suitable geometry to achieve a predetermined sealing force of the sealing element. For example, the structure may be formed as an auxetic structure having a negative Poisson's ratio, or a structure that provides a constant sealing pressure, or a structure that provides both positive and negative forces to normalize the sealing forces of the seal. Using additive manufacturing enables the geometry of the porous matrix structure to be selected for a particular application and more complex structures that would not be available using conventional manufacturing. The porous matrix structure may have an ordered lattice shape, or an irregular shape. For example, the porous matrix structure may have an open-cell foam shape.

Any additive manufacturing method may be used to produce the porous matrix structure. Exemplary additive manufacturing processes include material extrusion, material jetting, binder jetting, powder bed fusion, sheet lamination, vat polymerization, and directed energy deposition. Additive manufacturing is advantageous in enabling more complex geometries of the porous matrix structure as compared with the more limited geometries that may be available with conventional manufacturing processes such as injection molding, compression molding, machining, extrusion, and brazing. The sealing element may be formed using a combination of additive manufacturing and conventional manufacturing processes. Using additive manufacturing also enables a wider variety of materials to be used for the outer shell and porous matrix, including plastic materials, composite materials, and metal materials, as compared with conventional manufacturing processes that may be limited to particular materials.

In addition to the intrinsically energized sealing element enabling tuning of the sealing force, another advantage of the intrinsically energized sealing element is less complex manufacturing. Integrally forming the energizing element with the outer shell eliminates the need for providing secondary energizing features, such as an elastomeric band or spring as used in conventional energized seals. Thus, forming and installing the sealing element requires fewer steps as compared with the manufacturing process for conventional energized seals. Still another advantage is that the sealing element may be configured for critically damping specific frequencies in a noise, vibration, and hardness application.

According to an aspect of the invention, a sealing element includes an inner sealing body having a sealing lip, an outer shell defining an outer perimeter of the sealing element, and an energizing porous matrix structure that is formed integrally with the sealing lip or the outer shell and extends from the outer shell to the inner sealing body. The energizing porous matrix structure is used to tune a sealing force of the sealing element.

According to another aspect of the invention, a method of forming a sealing element includes forming an inner sealing lip, forming an outer shell defining an outer perimeter of the sealing element, using an additive manufacturing process to integrally form an energizing porous matrix structure with the outer shell or the inner sealing lip, and inserting the inner sealing lip in the outer shell, wherein the porous matrix structure extends between the outer shell and the inner sealing lip.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

DETAILED DESCRIPTION

The present invention is directed toward a sealing element having an intrinsic energizing element that is suitable for use in a variety of fluid power applications. Exemplary applications may be static or dynamic and have a wide range of operating conditions, from the tropics to the arctic, in submarines, oil tankers, spacecraft, windmills, steel mills, paper mills, refineries, farm tractors, appliances, medical equipment, and automobiles. The sealing element may be suitable for use in automotive transmissions, engines, electric motors, pumps, gearboxes, bearings, turbines, and large rolls used in steel and paper manufacturing. The wide range of operating conditions includes varying temperatures, pressures, velocities, media, and environments. The sealing element having the intrinsic energizing element may be configured for either low pressure or high pressure applications. Many other applications may be suitable.

Figure 1:
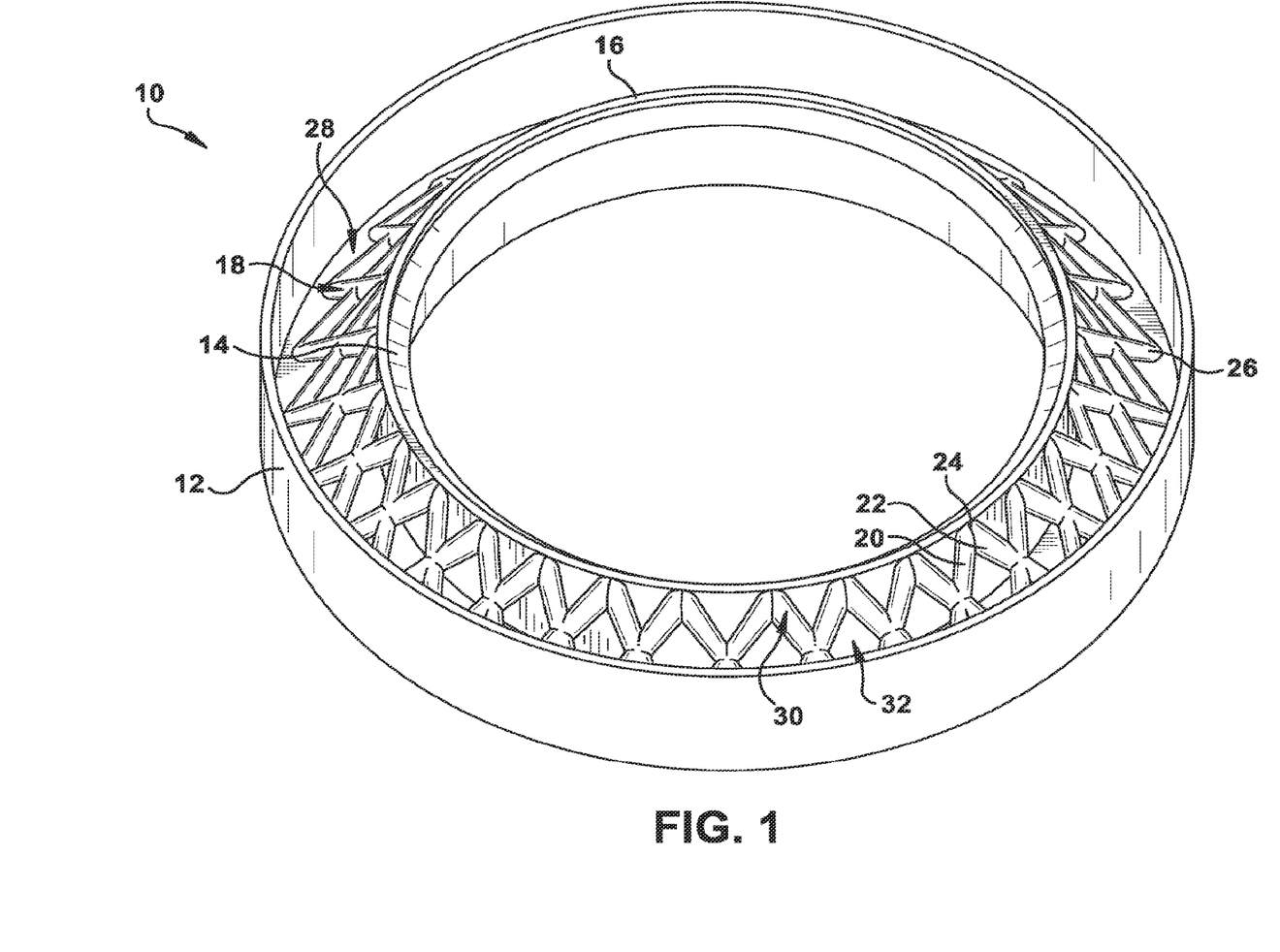
FIG. 1 is a drawing depicting an oblique view of an intrinsically energized sealing element according to an embodiment of the present application in which the sealing element is formed of an ordered porous matrix structure.

FIG. 1 shows a sealing element 10 having an intrinsic energizing element in accordance with an embodiment of the present application. The sealing element 10 has an outer shell 12, which may also be referred to as a case or a housing, and an inner sealing body 14 that defines a contact point or sealing lip 16. The sealing lip 16 defines an innermost diameter of the sealing element 10 that contacts a surface to be sealed. In an exemplary application in which the sealing element 10 is used for a rotary shaft, the sealing lip 16 may be used to protect a bearing used to support the shaft. The outer shell 12 defines an outer diameter of the sealing element 10 and supports the inner sealing body 14 within the outer shell 12. The outer shell 12 may be formed of a more rigid material as compared with the material of the inner sealing lip 16 such that the outer shell 12 may be provided to prevent over-flexing of the sealing lip 16. Any bonding, molding, or other attachment method may be suitable for securing the outer shell 12 and the inner sealing body 14 together.

The sealing element 10 includes an intrinsic energizing element that is formed integrally with the outer shell 12 and used to achieve a predetermined sealing force of the sealing element 10. The intrinsic energizing element is configured as a porous matrix structure 18 formed of a plurality of struts 20, 22 that are joined together at ends of the struts 20, 22, or at connecting points 24, 26. The porous matrix structure 18 may be configured as a support-type structure and is formed to extend between the outer shell 12 and the inner sealing body 14 in a radial region 28 defined between the outer shell 12 and the inner sealing body 14. The porous matrix structure 18 may have any suitable geometry to achieve desired material properties of the sealing element 10, such as stiffness, tensile strength, and ductility. For example, the porous matrix structure 18 may be formed as an auxetic structure having a negative Poisson's ratio. In other applications, the porous matrix structure 18 may be formed to enable a constant sealing pressure, or to provide both positive and negative forces that normalize the sealing forces.

The porous matrix structure 18 is advantageously formed by additive manufacturing which enables more complex geometries of the porous matrix structure 18 as compared with the limited geometries available with conventional manufacturing methods such as injection molding, compression molding, machining, and brazing. Any suitable type of additive manufacturing may be used to form the sealing element 10 with the porous matrix structure 18. For example, material extrusion, material jetting, binder jetting, powder bed fusion, sheet lamination, vat polymerization, and directed energy deposition may be suitable. Any combination thereof may be suitable. Still other suitable manufacturing processes for forming the intrinsic energizing element may include a combination of both additive manufacturing processes and conventional manufacturing processes, such as brazing or machining.

Substructures of the porous matrix structure 18, such as the struts 20, 22 may form an ordered pattern, or in alternative embodiments, the pattern of the porous matrix structure 18 may be irregular. The pattern may be formed of a plurality of sub-patterns and the pattern may be symmetrical. The porous matrix structure 18 may have a cellular shape or a lattice shape, as shown in FIG. 1. The shape may be truss-like or have honeycomb-like volume tessellations. The lattice shape may have crisscross-type formations, as shown in FIG. 1, and may be a diamond, tetragonal lattice, or cubic lattice. Other lattice shapes may be suitable. Other suitable patterns include tree-like support structures having branches, or straighter structures having bridge-like connectors. The porous matrix structure 18 defines a plurality of porous regions 30, 32 such that the porous matrix structure 18 has a predetermined porosity and density. The porosity and density are dependent on the application. In an exemplary embodiment, the porous matrix structure 18 may have a porosity that is greater than 50%. In another exemplary embodiment, the density of the porous matrix structure 18 may be increased to increase a sealing force of the sealing element 10 or decreased to decrease the sealing force.

In the exemplary embodiment of the porous matrix structure 18 shown in FIG. 1, each strut 20, 22 of the porous matrix structure may be tubular or rod-like in shape, and the lattice shape may have a plurality of diamond-shaped and triangular-shaped porous regions 30, 32. The struts 20, 22 may have other polygonal shapes in other embodiments. In still other embodiments, the struts 20, 22 may have different and irregular shapes. For example, the struts 20 may be The tubular struts 20, 22 may be arranged at acute or obtuse angles relative to adjacent struts 20, 22 and the struts 20, 22 may extend between the inner sealing body 14 and the outer shell 12 along a conical plane. In other exemplary embodiments, the struts may meet at right angles.

The struts 20, 22 may all be formed to have the same shape and dimensions, such as length and diameter, or in other exemplary embodiments, the struts 20, 22 may have different shapes and sizes. The size and shape may be dependent on the application and the desired sealing force for the sealing element 10. The outer shell 12 and the inner sealing body 14 may be annular in shape, and the porous matrix structure 18 may be configured to extend along an entire diameter of the sealing element 10. The porous matrix structure 18 may be uniformly arranged along the entire diameter of the sealing element 10, or in other exemplary embodiments, arranged in a disordered pattern to strengthen certain regions of the sealing element 10.

The connecting points 24, 26 between the struts 20, 22 may be arranged along the inner sealing body 14 and the outer shell 12. Two or more struts 20, 22 may meet at each connecting point 24, 26. A first set of connecting points, such as the connecting point 24, may be arranged along the inner sealing body 14 and another set of connecting points, such as the connecting point 26, may be radially spaced from the first set of connecting points and arranged along the outer shell 12. The struts 20, 22 may be connected only to other struts such that an unordered and open-cell foam structure is formed. The lattice shape may be axially inclined and extend radially outwardly from the first set of connecting points to the second set of connecting points. The connecting points 24, 26 may also be radially staggered relative to each other. Many other structural geometries of the porous matrix structure 18 may be suitable. Connecting points may also be arranged on the outer shell 12. Rib-like structures having undercuts may also be suitable. Any structural geometry that may be formed using additive manufacturing is suitable and additive manufacturing enables an infinite amount of different geometries and patterns to be formed.

The porous matrix structure 18 is formed of the same material as the outer shell 12, and any material that is suitable for additive manufacturing may be a suitable material. The material may be dependent on the application and the operating conditions. The outer shell 12 may have any suitable shape and different types of outer shells may be suitable. For example, the outer shell 12 may be an L-shaped case, a double case, a P-shaped case, or a heel case. The outer shell 12 may be covered or lined, such as with a thermoplastic material or rubber material. The bulk of the outer shell 12 and the porous matrix structure 18 may be formed of a plastic material or a composite material. Suitable plastic materials include acrylonitrile butadiene styrene, polyethylene materials, and thermoplastic elastomeric materials. Many other plastic materials may be suitable. In other exemplary embodiments, the material may be a metal material, such as aluminum, steel, stainless steel, and titanium. Other metal materials may be suitable.

The inner sealing body 14 may be formed of any suitable material, and the material may be dependent on the application and the material of the outer shell 12. Suitable materials include plastic materials. Nitrile materials, fluoroelastomeric materials, polytetrafluoroethylene, ethylene propylene, polyacrylate, silicone, and neoprene may all be suitable materials for the inner sealing body 14. Many other sealing materials may be suitable. The sealing element 10 may have any suitable dimensions and the dimensions are dependent on the application. In rotary shaft applications, the sealing element 10 may be configured for use with a wide range of shaft sizes having diameters between 3 and 2000 millimeters.

Using the additively manufactured porous matrix structure 18 is advantageous in that the porous matrix structure 18 may be formed integrally with the outer shell 12, and a more complex or specific geometry of the energizing element is achievable. Thus, the sealing element 10 may be formed to have any desired sealing force to obtain a specific sealing force of the sealing element 10, in contrast to conventional sealing elements formed by conventional manufacturing processes. Forming the porous matrix structure 18 integrally with the outer shell 12 also advantageously reduces the number of manufacturing steps used to form the sealing element 10. Providing the porous matrix structure 18 enables the sealing element 10 to provide the specific sealing force without a secondary energizing seal element, such as an elastomeric band or spring. Eliminating the secondary energizing element also reduces noise and vibrations during operation of the sealing element 10, and adding the porous matrix structure 18 provides improved damping within the sealing element 10.

Figure 2:
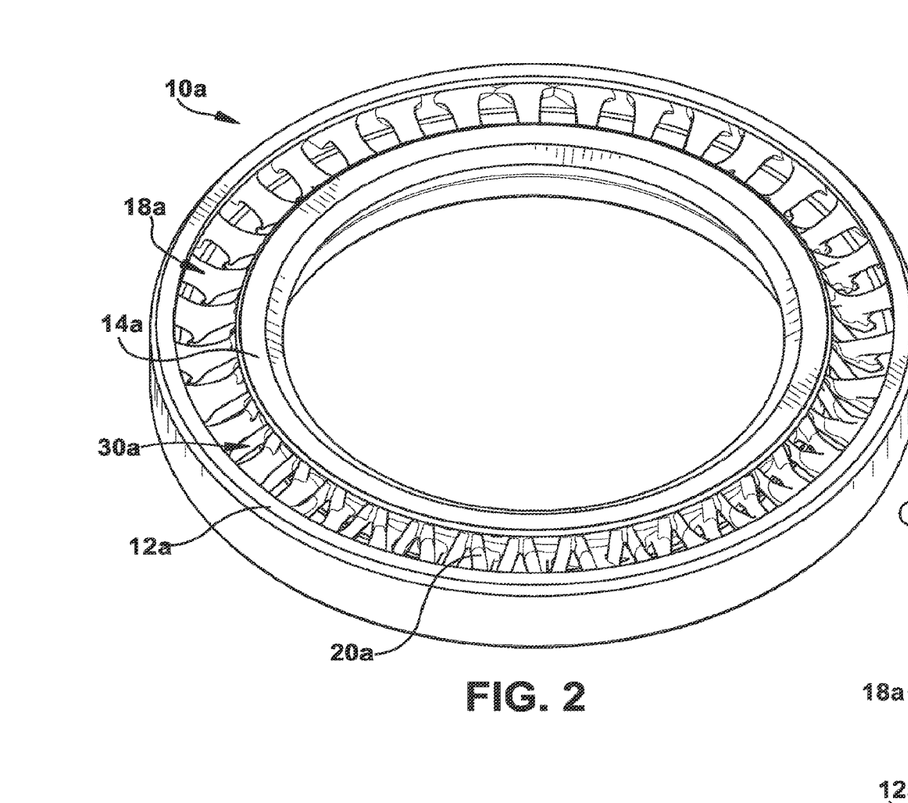
FIG. 2 is a drawing depicting an oblique view of an intrinsically energized sealing element according to another embodiment of the present application in which the sealing element is formed of a disordered porous matrix structure.
Figure 3:
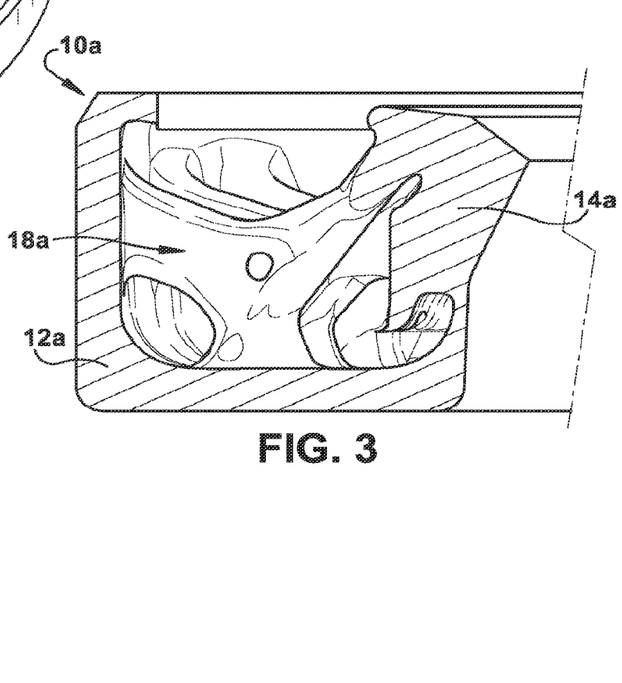
FIG. 3 is a drawing depicting a sectional view of the disordered porous matrix structure of FIG. 2.

Referring now to FIGS. 2 and 3, an intrinsically energized sealing element 10a according to another embodiment of the present application is shown in which the sealing element 10a is formed of a disordered porous matrix structure. The sealing element 10a includes the outer shell 12a, the inner sealing body 14a, and the porous matrix structure 18a which has a disordered pattern. The porous matrix structure 18a is formed of a plurality of struts 20a defining porous regions 30a. The struts 20a have different shapes and sizes. As shown in FIG. 2, the struts 20a may progressively change shape and size along the outer shell 12a.

Figures 4, 5:
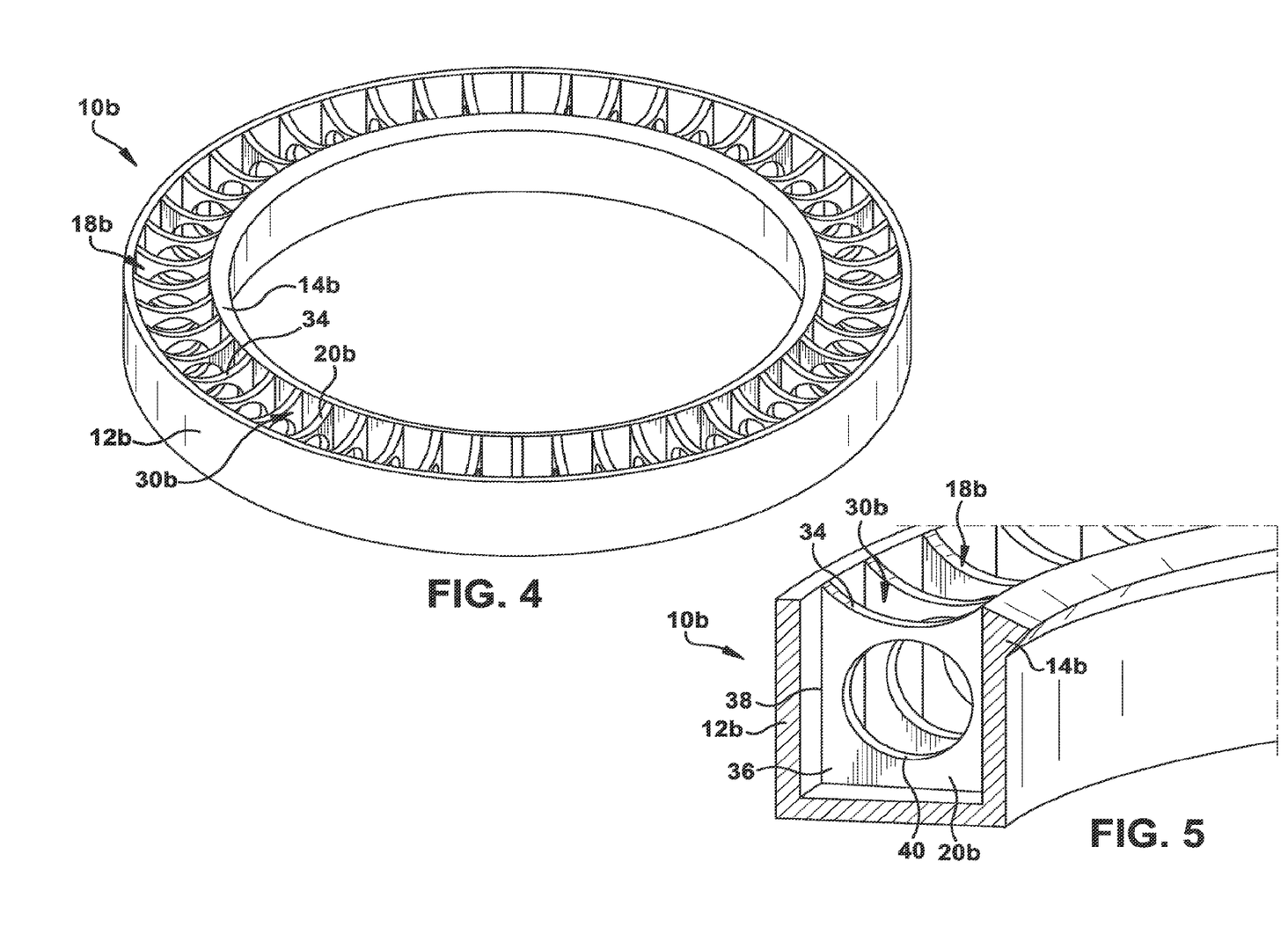
FIG. 4 is a drawing depicting an oblique view of an intrinsically energized sealing element according to still another embodiment of the present application in which the sealing element includes rib-like structures having undercuts.
FIG. 5 is a drawing depicting a sectional view of the rib-like structures having undercuts of FIG. 4.

Referring now to FIGS. 4 and 5, an intrinsically energized sealing element 10b according to still another embodiment of the present application is shown in which the sealing element 10b includes rib-like structures 20b having undercuts 34. The sealing element 10b includes the outer shell 12b, the inner sealing body 14b, and the porous matrix structure 18b. The porous matrix structure 18b is formed of a plurality of ribs 20b that are spaced to define porous regions 30b. The ribs 20b may have the same shape and size as shown in FIGS. 4 and 5. In other exemplary embodiments, the ribs 20b may be formed to have different shapes and sizes.

In an exemplary embodiment, each rib 20b may be formed as a plate-like or planar structure having planar surfaces 36 and a curved undercut 34 that extends in the radial direction. The planar surfaces 36 may extend in a direction that is parallel with a longitudinal axis defined by the sealing element 10b and the planar surface 26 may be integrally formed with the outer shell 12b. Three of the side edges 38 may extend along the outer shell 12b such that the rib 20b is formed as an insert with the undercut 34 extending radially from one side edge 38 to an opposite side edge. Each rib 20b may include a hole 38 having a circular shape or any other suitable shape that extends through the rib 20b.

Figure 6:
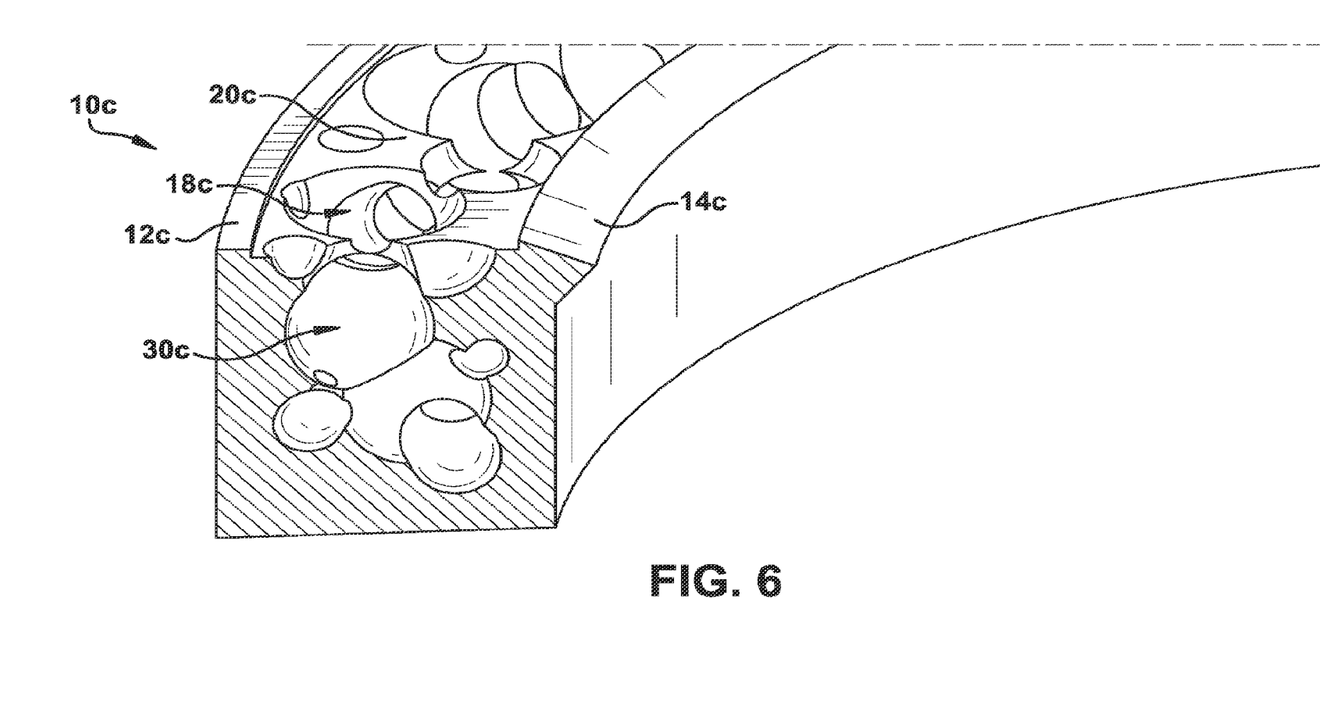
FIG. 6 is a drawing depicting a sectional view of an intrinsically energized sealing element according to still another embodiment of the present application in which the sealing element includes a disordered and open-cell foam structure.

Referring now to FIG. 6, an intrinsically energized sealing element 10c according to still another embodiment of the present application is shown in which the sealing element 10c includes a disordered and open-cell foam structure 18c that defines a plurality of porous regions 30c. The sealing element 10c includes the outer shell 12c and the inner sealing body 14c. As shown in FIG. 6, the foam structure 18c may be formed of a plurality of non-uniform and dissimilar strut structures 20c. In contrast to the disordered porous matrix 18a of the sealing element 10a shown in FIG. 2, which may have a pattern that gradually changes, the foam structure shown in FIG. 6 may not have any sort of repeating pattern.

A sealing element includes an inner sealing body having a sealing lip, an outer shell defining an outer perimeter of the sealing element, and an energizing porous matrix structure that is formed integrally with the sealing lip or the outer shell and extends from the outer shell to the inner sealing body. The energizing porous matrix structure is used to tune a sealing force of the sealing element.

The porous matrix structure may be defined by a plurality of struts that are joined together at ends of the struts.

The ends of the struts may be joined together at connecting points and a plurality of connecting points may be arranged along the inner sealing body.

The sealing element may include another plurality of connecting points that are arranged along the outer shell and radially spaced from the connecting points arranged along the inner sealing body.

The connecting points arranged along the inner sealing body may be staggered relative to the connecting points arranged along the outer shell.

The porous matrix structure may have a lattice shape.

The porous matrix structure may be an auxetic structure having a negative Poisson's ratio.

The porous matrix structure may extend radially outwardly from the sealing lip.

The porous matrix structure may be conical in shape.

The energizing porous matrix structure and the outer shell may be formed of a same material.

The material may be a thermoplastic material.

The material may be a metal material.

The porous matrix structure may extend along an entire length of the inner sealing body.

The porous matrix structure may have an ordered pattern.

The porous matrix structure may have a disordered foam structure formed of a plurality of struts that are only connected to each other.

The porous matrix structure may be formed of a plurality of rib structures.

The rib structures may include undercuts.

A method of forming a sealing element includes forming an inner sealing lip, forming an outer shell defining an outer perimeter of the sealing element, using an additive manufacturing process to integrally form an energizing porous matrix structure with the outer shell or the inner sealing lip, and inserting the inner sealing lip in the outer shell, wherein the porous matrix structure extends between the outer shell and the inner sealing lip.

The method may include selecting a geometry of the porous matrix structure to obtain a predetermined sealing force of the sealing element.

The method may include forming the porous matrix structure to have a negative Poisson's ratio.

The method may include adjusting a density of the porous matrix structure.

The method may include forming the outer shell and the porous matrix structure of a same material that is a thermoplastic material or a metal material.

The method may include forming the porous matrix structure of a plurality of struts that are joined together at ends of the struts.

The method may include joining the ends of the struts at connecting points and arranging a plurality of connecting points along the inner sealing lip.

The method may include forming another plurality of connecting points along the outer shell and radially spacing the connecting points from the connecting points arranged along the inner sealing lip.

The method may include staggering the connecting points along the inner sealing lip relative to the connecting points arranged along the outer shell.

The method may include forming the porous matrix structure to have an ordered pattern of the struts.

The method may include forming the porous matrix structure to have a disordered foam structure formed of a plurality of struts that only connected to other struts.

The method may include forming the porous matrix structure of a plurality of rib structures.

The method may include forming undercuts on the plurality of rib structures.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A sealing element comprising:
    an inner sealing body having a sealing lip defining an innermost diameter of the sealing element that forms a contact point to contact a surface to be sealed;
    an outer shell defining an outer perimeter of the sealing element and forming a housing for the inner sealing body; and
    an energizing porous matrix structure that is formed integrally with the sealing lip or the outer shell and extends from the outer shell to the inner sealing body, wherein the energizing porous matrix structure is defined by a plurality of struts, each respective pair of the plurality of struts being directly joined together at respective ends of the struts to define a plurality of connecting points,
    wherein the plurality of connecting points arranged along the outer shell are radially spaced from the plurality of connecting points arranged along the inner sealing body, and
    wherein the energizing porous matrix structure is used to tune a sealing force of the sealing element by adjusting a geometry of the energizing porous matrix structure.

2. The sealing element according to claim 1, wherein the plurality of connecting points arranged along the inner sealing body are staggered relative to the plurality of connecting points arranged along the outer shell.

3. The sealing element according to claim 1, wherein the porous matrix structure has a lattice shape.

4. The sealing element according to claim 1, wherein the porous matrix structure is an auxetic structure having a negative Poisson's ratio.

5. The sealing element according to claim 1, wherein the porous matrix structure extends radially outwardly from the sealing lip.

6. The sealing element according to claim 1, wherein the porous matrix structure is conical in shape.

7. The sealing element according to claim 1, wherein the energizing porous matrix structure and the outer shell are formed of a same material.

8. The sealing element according to claim 7, wherein the material is a thermoplastic material.

9. The sealing element according to claim 7, wherein the material is a metal material.

10. The sealing element according to claim 1, wherein the porous matrix structure extends along an entire length of the inner sealing body.

11. The sealing element according to claim 1, wherein the porous matrix structure has an ordered pattern.

12. The sealing element according to claim 1, wherein the porous matrix structure has a disordered foam structure formed of a plurality of struts that are only connected to each other.

13. A method of forming a sealing element comprising:
forming an inner sealing lip on an inner sealing body, the inner sealing lip defining an innermost diameter of the sealing element that forms a contact point to contact a surface to be sealed;
forming an outer shell that defines an outer perimeter of the sealing element and forms a housing for the inner sealing body;
using an additive manufacturing process to integrally form an energizing porous matrix structure with the outer shell or the inner sealing lip, wherein the energizing porous matrix structure is formed of a plurality of struts, each respective pair of the plurality of struts being directly joined together at respective ends of the struts to define a plurality of connecting points arranged along each of the outer shell and the inner sealing body;
forming the porous matrix structure of the plurality of struts that are directly joined together at respective ends of the struts;
radially spacing the plurality of connecting points of the outer shell from the plurality of connecting points arranged along the inner sealing lip; selecting a geometry of the porous matrix structure to obtain a predetermined sealing force of the sealing element; and
inserting the inner sealing lip in the outer shell, wherein the porous matrix structure extends between the outer shell and the inner sealing lip.

14. The method according to claim 13 further comprising forming the porous matrix structure to have a negative Poisson's ratio.

15. The method according to claim 13 further comprising forming the outer shell and the porous matrix structure of a same material that is a thermoplastic material or a metal material.

16. The method according to claim 13 further comprising staggering the plurality of connecting points along the inner sealing lip relative to the plurality of connecting points arranged along the outer shell.

17. The method according to claim 13 further comprising forming the porous matrix structure to have an ordered pattern of the struts.

18. The method according to claim 13 further comprising forming the porous matrix structure to have a disordered foam structure formed of a plurality of struts that are only connected to other struts.

* * * * *